July 5, 1960 R. T. CAHILL ET AL 2,943,872
SEALS
Filed July 16, 1957 2 Sheets-Sheet 1
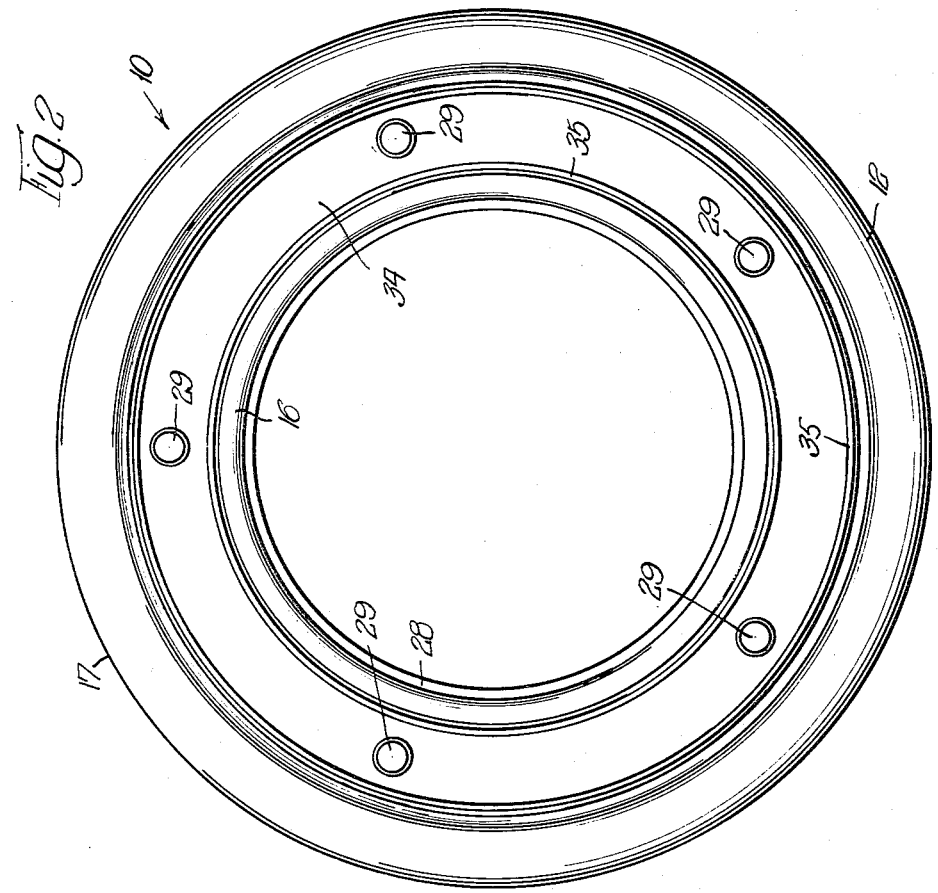
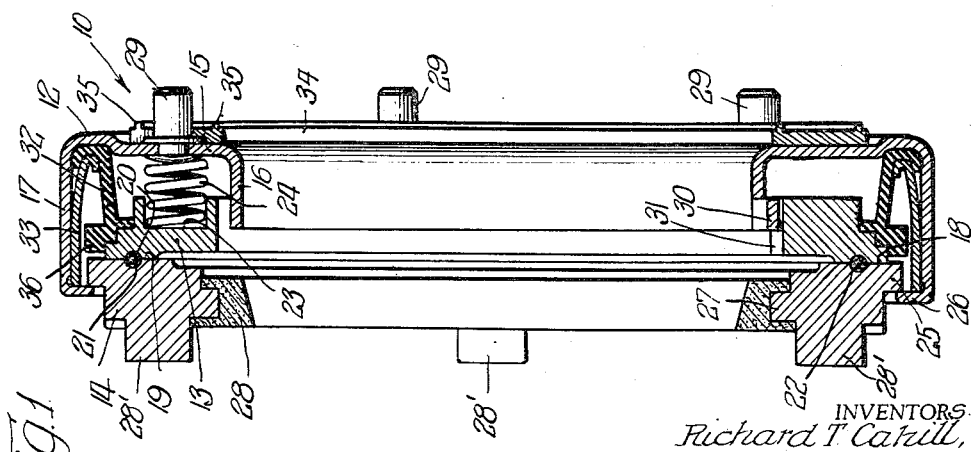
INVENTORS
Richard T. Cahill,
BY Edward A. Wheelock,
Cromwell, Greist & Warden
ATTYS July 5, 1960 R. T. CAHILL ET AL 2,943,872
SEALS
Filed July 16, 1957 2 Sheets-Sheet 2
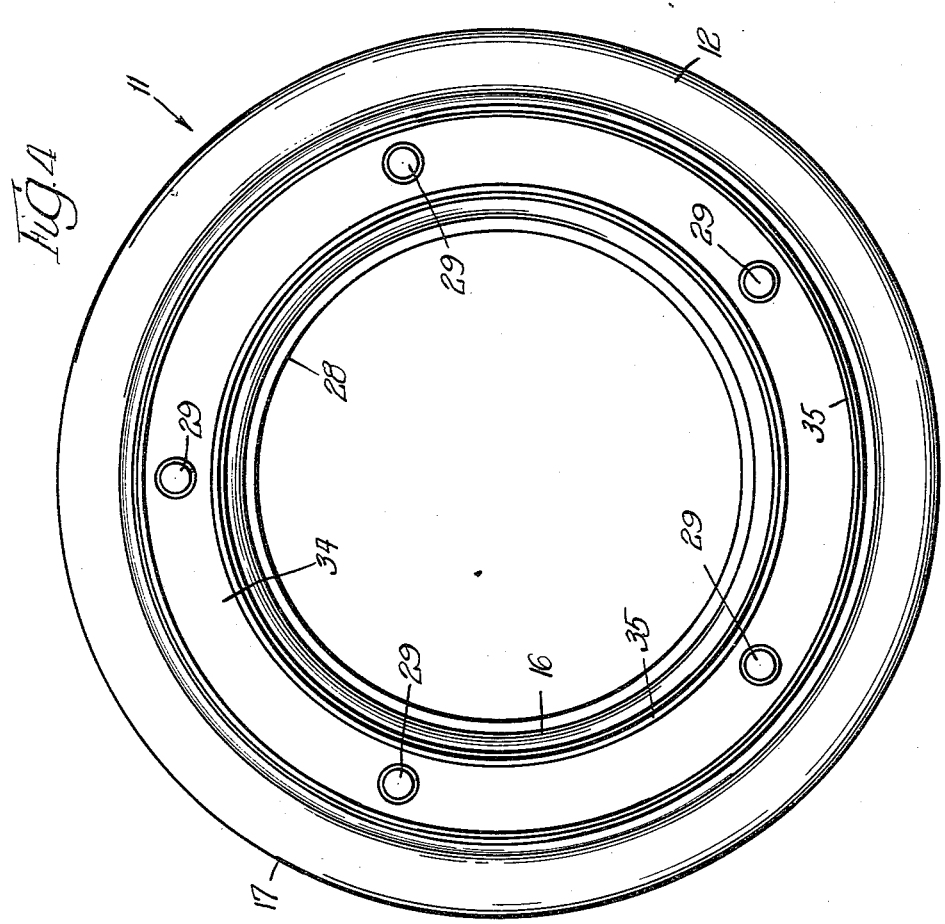
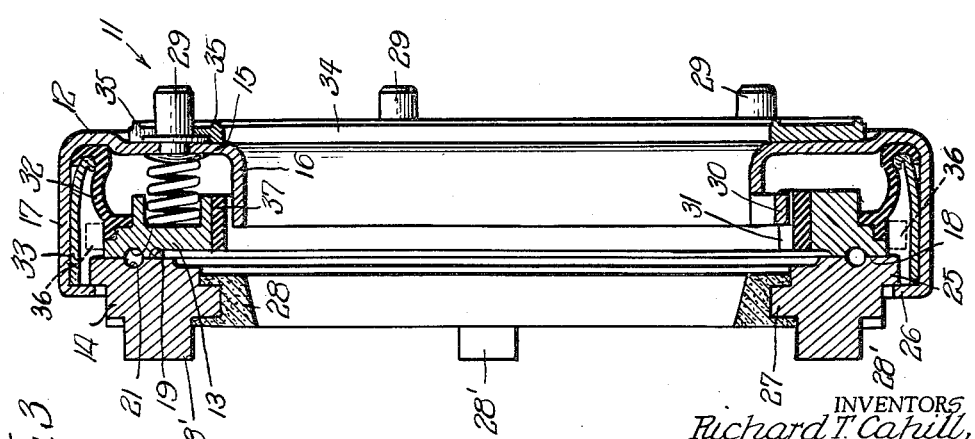
INVENTORS
Richard T. Cahill,
BY Edward A. Wheelock,
Cromwell, Greist & Warden
Attys.

United States Patent Office 2,943,872
Patented July 5, 1960

2,943,872
SEALS

Richard T. Cahill, Arlington Heights, and Edward A. Wheelock, Lake Zurich, Ill., assignors to Chicago Rawhide Manufacturing Company, Chicago, Ill., a corporation of Illinois Filed July 16, 1957, Ser. No. 672,325

14 Claims. (Cl. 286—11)

The present invention is directed to improved forms of end face rotary type seals which utilize a sealing ring carried by a casing member which is mounted in a shaft housing for moving end face sealing engagement with a surface such as that provided by a mating ring which may be self-contained with the sealing ring within the casing member.

It is an object of the present invention to provide an improved end face rotary type seal having a sealing ring mounted within a casing member for end face sealing engagement with a surface, the casing member holding the sealing ring against rotation relative thereto while permitting eccentric movement of the ring within the casing, the ring being provided on at least one peripheral surface thereof with cushioning means for cushioning abutment action between the ring and the adjacent inner surfaces of the casing member to prevent damage to the sealing ring as a result of eccentric movement of the same within the casing member.

A further object is to provide improved forms of end face rotary type seals wherein a casing member contains therein a sealing ring and mating ring, the rings being in end face sealing engagement, the sealing ring being fixed by the casing against rotation relative thereto while being free within the casing for eccentric movement therein into abutment with the adjacent inner surfaces of the casing, cushioning means being provided on the sealing ring to absorb abutment contact forces upon eccentric movement of the same within the casing member, the engaged sealing surfaces of the sealing ring and mating ring each carrying aligned grooves for lubricating purposes.

Still a further object is to provide improved forms of end face rotary type seals wherein a casing member carries axially movable sealing and mating rings in end face sealing engagement, the sealing ring being held by the casing member against rotation relative thereto while being free to move eccentrically therein into contact with the inner surfaces of the casing member, the sealing ring carrying cushioning means on the inner and/or outer peripheral surfaces thereof to cushion abutment between the same and the casing member, the sealing face of the mating ring overlapping that of the sealing ring to maintain full sealing area contact during eccentric movement of one of the rings relative to the other within the casing member.

Other objects not specifically set forth will become apparent from the following detailed description made in conjunction with the drawings wherein:

Fig. 1 is a sectional view of one form of improved end face rotary type seal of the present invention;

Fig. 2 is an end elevation of the seal of Fig. 1 as viewed toward the left in Fig. 1;

Fig. 3 is a sectional view of another form of improved end face rotary type seal forming a part of the present invention; and Fig. 4 is an end face elevation of the seal of Fig. 3 as viewed toward the left in Fig. 3.

The seal 10 of Figs. 1 and 2 and the seal 11 of Figs. 3 and 4 are of identical structural arrangement insofar as the basic features are concerned. Each of the seals basically correspond to known structural designs of end face rotary type seals and the structural features common to both of the seals 10 and 11 are merely illustrative of the general type of oil seal which is improved by incorporating the principles of the present invention. In describing the structural features of the seals 10 and 11, the same reference numerals will be used to identify similar parts.

The seals 10 and 11 include an annular casing member 12 which carries therein a sealing ring 13 and a mating ring 14. The casing member 12 is generally U-shaped in cross section and opens axially toward the mating ring 14. The casing member 12 is formed from integrally joined wall portions including a radially directed end wall 15, an axially directed inner wall 16 and an axially directed outer wall 17. The sealing ring is provided with a radial sealing face 18 which is held in rubbing sealing engagement with a radial sealing face 19 of the mating ring 14. Each of the sealing faces 18 and 19 carries a circumferentially continuous arcuate groove 20 and 21 respectively which are aligned when the end faces are in abutment to provide a lubricant retaining chamber located centrally of the sealing area afforded by the rings 13 and 14. The grooves 20 and 21 serve to provide for extended area lubrication of the end faces 18 and 19 to reduce frictional wear therealong during use of the seals 10 and 11, the quantity of lubricant supplied being insufficient to interfere with efficient sealing action between the rings 13 and 14. As illustrated in connection with the seal 10, the aligned grooves 20 and 21 may carry a lubricant-containing packing 22 if desired.

The sealing ring 13 is provided with a plurality of spaced, rearwardly opening spring retaining holes or seats 23 in the rear face thereof which seat therein a plurality of circumferentially spaced coil springs 24, the opposite ends of each of the springs being suitably seated against the inner surface of the end wall 15 of the casing member 12. The mating ring 14 is provided with a circumferentially continuous, radially outwardly projecting shoulder 25 which is received within the casing 12 and held therein by a radially inwardly turned flange 26 formed integral with the free end of the outermost wall 17 of the casing member 12. The inner diameter of the circumferential flange 26 is less than the outer diameter of the shoulder portion 25 of the mating ring 14 so as to overlap the same and contain the mating ring 14 within the casing member 12. With this arrangement the seals 10 and 11 are self-contained and the coil springs 24 urge the sealing ring 13 into end face abutment with the mating ring 14, the total axial movement of the sealing ring 13 within the casing member 12 being limited by abutment between the mating ring and the flange 26.

The mating ring 14 is further provided with a radially inwardly directed shoulder-like rib 27 which mounts thereon a radially acting sealing gasket 28 for engagement with a shaft or suitable cylindrical surface to be sealed thereby. The gasket 28 is further held relative to the mating ring 14 by pin-like projections 28' integrally formed on the outer face of the mating ring 14 and extending through slots or grooves formed in the radially directed mounting portion of the gasket 28 in the known manner. If the mating ring 14 is mounted on a shaft by means of the gasket 28, the ring will rotate relative to the housing 12 which would be held against rotation in a shaft housing by pins 29 suitably attached in a known manner to the radial end wall 15 of the casing member 12. Conversely, the pins 29 may function as drive pins which are fixed to an enlarged portion of a shaft or to a rotating shaft housing journalling a fixed shaft to rotate the casing 12 relative to the mating ring 14 which would then be mounted on a fixed surface such as a portion of the fixed shaft. Regardless of the manner in which the seals 10 and 11 are used, one of the rings 13 and 14 rotates relative to the other to provide a moving or rubbing end face sealing action between the abutting sealing faces 20 and 21.

In order to provide for the type of operation described, the sealing ring 13 is fixed against rotation relative to the casing member 12 by any suitable provision such as a plurality of lug-like portions 30 expanded from the inner axial wall 16 of the casing member 12 and received within axial grooves 31 formed in the inner periphery of the sealing ring 13. The lugs 30 and grooves 31 are designed to allow axial movement of the sealing ring 13 within the casing member 12 while holding the ring against rotation in the known manner.

The casing member 12 further carries a flexible annular diaphragm 32 which is clamped at one end by an annular spring collar 33 against the inner surface of the end wall 15 of the casing member 12. The spring collar 33 is held in place within the casing member 12 by abutment at the remaining end thereof with the inner surfaces of the radial flange 26. The spring collar 33 is tensioned upon the assembly of the seals 10 and 11 to tightly anchor the end of the diaphragm 32 in contact therewith within the casing member 12. The remaining end of the diaphragm 32 is suitably attached to recessed surfaces formed in the outer peripheral portion of the sealing ring 13 in accordance with conventional practices. The diaphragm 32 flexes in response to axial movement of the sealing ring 13 within the casing member 12.

In the structure shown, the seals 10 and 11 are further provided with an end face gasket 34 which is suitably apertured to be mounted by the pins 29 on the outer face of radial wall 15 of the casing member 12. The gasket 34 is provided with radially spaced sealing ribs 35 which engage the radial surface on which the casing member 12 is mounted by reason of the pins 29.

One important structural feature of the seals 10 and 11 has already been described in connection with the provision of the lubrication extending grooves 20 and 21 carried by the sealing faces 18 and 19. Another important structural feature providing for improved operation of the seals 10 and 11 is the provision of a mating ring end face sealing surface 19 which is of substantially greater radial dimension than the end face sealing surface 18 of the sealing ring 13. The sealing face 19 thus both radially outwardly and radially inwardly substantially overlaps the sealing face 18 and upon eccentric movement or radial displacement of one of the rings relative to the other within the casing member 12, the requisite sealing area will be completely maintained without loss of efficiency in the operation of the seals 10 and 11.

The sealing ring 13 while being fixed against rotation relative to the casing member 12 can nevertheless move eccentrically thereto within the casing 12. Upon eccentric movement of the sealing ring 13, the sealing face 18 thereof will slide radially along the sealing face 19 of the mating ring 14. If eccentric mounting or movement of the sealing ring 13 should result in an overhanging of a portion of the sealing face 18 thereof, the total effective end face sealing area would be reduced to the extent of the area of the sealing face 18 overhanging the sealing face 19. In order to prevent such an occurrence which results in a loss in sealing efficiency, the sealing face 19 of the mating ring 14 is provided with a substantial radial area which overlaps the sealing face 18 of the sealing ring 13 both at the outer diameter and inner diameter.

In the manufacture of the seals 10 and 11, it is preferable to cast rings 13 and 14 in order to maintain the manufacturing costs at a minimum. Cast rings are more susceptible to breakage upon abutment contact with metallic surfaces and it has been found that eccentric movement of the sealing ring 13 within the casing member 12 can result in breakage of the same when the sealing ring 13 sharply abuts and adjacent inner surface of the casing member 12. In order to prevent breakage of this type, a resilient cushion is applied to at least one peripheral surface of the sealing ring 13 to cushion abutment of the same with an adjacent inner surface of the casing member 12. The resilient cushion may be placed on either the inner or outer peripheral surface of the sealing ring 13 or, if desired, may be carried by both peripheral surfaces.

As shown in Fig. 1, the seal 10 is provided with a circumferentially continuous resilient cushion 36 which is formed integral with the end of the diaphragm 32 attached to the outer peripheral portion of the sealing ring 13. The cushion 36 is provided with sufficient radial thickness to be maintained in close association with the inner surface of the spring collar 33 and upon slight eccentric movement of the sealing ring 13 relative to the casing member 12, abutment between the outer surface of the cushion 36 and the inner surface of the spring collar 33 results. The spacing is such that cushioning abutment occurs prior to metal-to-metal contact between the inner periphery of the sealing ring 13 and the inner surface of the inner wall 16 of the casing member 12. With the provision of the cushion 36 along the outer peripheral surface of the sealing ring 13, no metal-to-metal contact will occur between the outer portion of the sealing ring 13 and the adjacent inner portion of the casing member 12.

The seal 11 of Fig. 3 is provided with a circumferentially continuous resilient cushion 37 suitably attached to the inner periphery of the sealing ring 13 in close association with the inner surface of the inner wall 16 of the casing member 12. The cushion 37 is flowed into the grooves 31 to retain their cooperative function with the locking lugs 30 carried by the sealing ring 13 while at the same time preventing metal-to-metal abutment between opposed surfaces of the same upon eccentric movement of the sealing ring 13 within the casing member 12. The radial thickness of the cushion 37 is such that the free surface of the same will contact the adjacent surface of the inner wall 16 prior to contact between the outer peripheral surface of the mating ring 13 with the adjacent surfaces of the casing member 12.

While the resilient cushions 36 and 37 can both be applied to the sealing ring 13 as illustrated in Fig. 3 wherein the cushion 36 is shown in broken lines as an integral part of the diaphragm 32, it has been found that the use of one or the other is fully adequate to prevent operational damage to the sealing ring 13. While the cushions 36 and 37 have been described as being circumferentially continuous, it will be apparent that a plurality of separate arcuate pads may be used to provide the same desirable result. The use of the cushion 36 is particularly desirable in that it may be readily formed during the molding operation followed in forming the flexible diaphragm 32. No extra assembly step is necessary to apply the cushion 36 to the sealing ring 13 as the same will automatically be positioned in its operative location upon attachment of the diaphragm 32 to the outer peripheral portion of the sealing ring 13.

Obviously many modifications and variations of the invention as hereinbefore set forth may be made without departing from the spirit and scope thereof, and therefore only such limitations should be imposed as are indicated in the appended claims.

We claim:
1. An end face rotary type seal including a sealing ring for end face sealing engagement with a surface, a casing member mounting said ring against rotation relative thereto, said sealing ring being eccentrically movable within said casing member, and a resilient cushion associated with at least one peripheral surface of said sealing ring to cushion abutment between said sealing ring and the adjacent inner surface of said casing member, said cushion being spaced from said adjacent inner surface upon concentric positioning of said sealing ring in said casing member.

2. An end face rotary type seal including a pair of relatively rotatable rings in end face sealing engagement, a casing member mounting said rings therein with one of said rings being held against rotation relative thereto, said one ring being eccentrically movable within said casing member, and a resilient cushion associated with at least one peripheral surface of said one ring to cushion abutment between said one ring and the adjacent inner surface of said casing member, said cushion being spaced from said adjacent inner surface upon concentric positioning of said one ring in said casing member.

3. An end face rotary type seal including a pair of relatively rotatable rings in end face sealing engagement, a casing member mounting said rings therein with one of said rings being held against rotation relative thereto, said one ring being eccentrically movable within said casing member, and a resilient cushion associated with at least one peripheral surface of said one ring to cushion abutment between said one ring and the adjacent inner surface of said casing member, said cushion being spaced from said adjacent inner surface upon concentric positioning of said one ring in said casing member, the sealing faces of said rings each carrying grooves therein in register with one another for lubrication extending purposes.

4. An end face rotary type seal including a sealing ring and a mating ring in end face sealing engagement, a casing member mounting said rings therein with said sealing ring being held against rotation relative thereto, said sealing ring being eccentrically movable within said casing member, and a resilient cushion associated with at least one peripheral surface of said sealing ring to cushion abutment between said sealing ring and the adjacent inner surface of said casing member, said cushion being spaced from said adjacent inner surface upon concentric positioning of said sealing ring in said casing member.

5. An end face rotary type seal including a sealing ring and a mating ring in end face sealing engagement, a casing member mounting said rings therein with said sealing ring being held against rotation relative thereto, said sealing ring being eccentrically movable within said casing member, and a reslient cushion carried by the inner peripheral surface of said sealing ring to cushion abutment between said sealing ring and the adjacent inner surface of said casing member, said cushion being spaced from said adjacent inner surface upon concentric positioning of said sealing ring in said casing member.

6. An end face rotary type seal including a sealing ring and mating ring in end face sealing engagement, a casing member mounting said rings therein with said sealing ring being held against rotation relative thereto, said sealing ring being eccentrically movable within said casing member, and a resilient cushion carried by the outer peripheral surface of said sealing ring to cushion abutment between said sealing ring and the adjacent inner surface of said casing member, said cushion being spaced from said adjacent inner surface upon concentric positioning of said sealing ring in said casing member.

7. An end face rotary type seal including a sealing ring and mating ring in end face sealing engagement, a casing member mounting said rings therein with said sealing ring being held against rotation relative thereto, said sealing ring being eccentrically movable within said casing member, and a resilient cushion carried by at least one peripheral surface of said sealing ring to cushion abutment between said sealing ring and the adjacent inner surface of said casing member, said cushion being spaced from said adjacent inner surface upon concentric positioning of said sealing ring in said casing member, the sealing faces of said rings each carrying grooves therein in register with one another for lubrication extending purposes.

8. An end face rotary type seal including a sealing ring and mating ring in end face sealing engagement, a casing member mounting said rings therein with said sealing ring being held against rotation relative thereto, said sealing ring being eccentrically movable within said casing member, and a resilient cushion carried by at least one peripheral surface of said sealing ring to cushion abutment between said sealing ring and the adjacent inner surface of said casing member, said cushion being spaced from said adjacent inner surface upon concentric positioning of said sealing ring in said casing member, the sealing face of said mating ring overlapping that of said sealing ring to maintain full sealing area functioning during eccentric movement of one of said rings relative to the other.

9. An end face rotary type seal including a sealing ring and mating ring in end face sealing engagement, a casing member mounting said rings therein with said sealing ring being held against rotation relative thereto, said sealing ring being eccentrically movable within said casing member, and a resilient cushion carried by at least one peripheral surface of said sealing ring to cushion abutment between said sealing ring and the adjacent inner surface of said casing member, said cushion being spaced from said adjacent inner surface upon concentric positioning of said sealing ring in said casing member, the sealing faces of said rings each carrying grooves therein in register with one another for lubrication extending purposes, the sealing face of said mating ring overlapping that of said sealing ring to maintain full sealing area functioning during eccentric movement of one of said rings relative to the other.

10. An end face rotary type seal including a sealing ring and mating ring in end face sealing engagement, a casing member mounting said rings therein with said sealing ring being held against rotation relative thereto, said sealing ring being eccentrically movable within said casing member, a resilient cushion associated with the outer peripheral surface of said sealing ring to cushion abutment between said sealing ring and the adjacent inner surface of said casing member, said cushion being spaced from said adjacent inner surface upon concentric positioning of said sealing ring in said casing member, and an annular flexible diaphragm interconnecting said casing member with the outer peripheral portion of said sealing ring, the end of said diaphragm attached to said sealing ring having the resilient cushion formed integrally thereto.

11. An end face rotary type seal including a sealing ring and mating ring in end face sealing engagement, a casing member mounting said rings therein with said sealing ring being held against rotation relative thereto, said sealing ring being eccentrically movable within said casing member, a resilient cushion carried by the inner peripheral surface of said sealing ring to cushion abutment between said sealing ring and the adjacent inner surface of said casing member, said cushion being spaced from said adjacent inner surface upon concentric positioning of said sealing ring in said casing member, the sealing faces of said rings each carrying grooves therein in register with one another for lubrication extending purposes, the sealing face of said mating ring overlapping that of said sealing ring to maintain full sealing area functioning during eccentric movement of one of said rings relative to the other, and resilient spring means urging said sealing ring into engagement with said mating ring.

12. An end face rotary type seal including a sealing ring and mating ring in end face sealing engagement, a casing member mounting said rings therein with said sealing ring being held against rotation relative thereto, said sealing ring being eccentrically movable within said casing member, a resilient cushion carried by the outer peripheral surface of said sealing ring to cushion abutment between said sealing ring and the adjacent surface of said casing member, said cushion being spaced from said adjacent inner surface upon concentric positioning of said sealing ring in said casing member, the sealing faces of said rings each carrying grooves therein in register with one another for lubrication extending purposes, the sealing face of said mating ring overlapping that of said sealing ring to maintain full sealing area functioning during eccentric movement of one of said rings relative to the other, resilient spring means urging said sealing ring into engagement with said mating ring, and an annular flexible diaphragm interconnecting said casing member with the outer peripheral portion of said sealing ring, the end of said diaphragm attached to said sealing ring having said resilient cushion formed integrally thereto.

13. An end face rotary type seal including a sealing ring and mating ring in end face sealing engagement, a casing member mounting said rings therein with said sealing ring being held against rotation relative thereto, said sealing ring being eccentrically movable within said casing member, resilient cushions carried by the inner and outer peripheral surfaces of said sealing ring to cushion abutment between said sealing ring and the adjacent inner surfaces of said casing member, said cushions being spaced from said adjacent inner surfaces upon concentric positioning of said sealing ring in said casing member.

14. An end face rotary type seal including a sealing ring and mating ring in end face sealing engagement, a casing member mounting said rings therein with said sealing ring being held against rotation relative thereto, said sealing ring being eccentrically movable within said casing member, resilient cushions carried by the inner and outer peripheral surfaces of said sealing ring to cushion abutment between said sealing ring and the adjacent inner surfaces of said casing member, said cushions being spaced from said adjacent inner surfaces upon concentric positioning of said sealing ring in said casing member, the sealing faces of said rings each carrying grooves therein in register with one another for lubrication extending purposes, the sealing face of said mating ring overlapping that of said sealing ring to maintain full sealing area functioning during eccentric movement of one of said rings relative to the other, resilient spring means urging said sealing ring into engagement with said mating ring, and an annular flexible diaphragm interconnecting said casing member with the outer peripheral portion of said sealing ring, the end of said diaphragm attached to said sealing ring having the outer resilient cushion formed integrally therewith.

References Cited in the file of this patent

UNITED STATES PATENTS

| 2,662,785 | Fawick | Dec. 15, 1953 |

FOREIGN PATENTS

| 147,008 | Australia | June 24, 1952 |
| 766,717 | Great Britain | Jan. 23, 1957 |